US008023407B2

(12) United States Patent
Labaume

(10) Patent No.: US 8,023,407 B2
(45) Date of Patent: Sep. 20, 2011

(54) REDUNDANCY IN A COMMUNICATION NETWORK

(75) Inventor: Pierre R. Labaume, Auteuil le Roi (FR)

(73) Assignee: Aastra Telecom Schweiz AG, Auteuil le Roi (FR)

( * ) Notice: Subject to any disclaimer, the term of this patent is extended or adjusted under 35 U.S.C. 154(b) by 199 days.

(21) Appl. No.: 12/416,535

(22) Filed: Apr. 1, 2009

(65) Prior Publication Data
US 2009/0257347 A1    Oct. 15, 2009

Related U.S. Application Data

(60) Provisional application No. 61/041,729, filed on Apr. 2, 2008.

(51) Int. Cl.
*H04J 1/00*    (2006.01)

(52) U.S. Cl. ......... 370/219; 370/331; 370/338; 455/442
(58) Field of Classification Search .......... 370/216–228, 370/254–258, 329–334, 338, 389, 392, 474, 370/475; 455/436–444; 714/1–5
See application file for complete search history.

(56) References Cited

U.S. PATENT DOCUMENTS

| | | | |
|---|---|---|---|
| 2003/0018927 A1* | 1/2003 | Gadir et al. ...................... 714/4 |
| 2007/0198710 A1 | 8/2007 | Gopalakrishnan |
| 2009/0276842 A1* | 11/2009 | Yevmenkin et al. ............ 726/13 |

* cited by examiner

*Primary Examiner* — Ricky Ngo
*Assistant Examiner* — Pao Sinkantarakorn

(57) ABSTRACT

A method for providing redundancy within a communication network, the method provides means for using the same IP address with a plurality of hosts located in different subnets, non-simultaneously, without requiring any additional programming for routers in the network.

20 Claims, 2 Drawing Sheets

REDUNDANCY IN A COMMUNICATION NETWORK

CROSS-REFERENCE TO RELATED APPLICATIONS

This application claims the benefit of priority to U.S. Provisional Application Ser. No. 61/041,729, filed on Apr. 2, 2008.

BACKGROUND OF THE INVENTION

1. Field of the Invention

The present invention relates to communication networks, and more particularly to a system and method for providing redundancy within a communication network.

2. Description of the Related Art

Redundancy is often desirable within communication networks, and generally includes employing fail-over mechanisms, such as, providing a backup server (secondary) for a primary server. One of the proposed solutions includes using two different IP addresses, one for the primary server and another for the secondary server. However, any client/server applications (mainly telephony applications) connected to the primary call server would need to be modified in order to facilitate using two different IP addresses for the same service.

Another solution consists of using VPN equipment to connect the secondary server to the LAN of the primary server, thus having the two servers on the same subnet. However, for operational or security reasons, it is often more desirable to have the two servers located at two different locations, and thus the above-noted proposals do not adequately address this need. It is thus an object of the present invention to mitigate or obviate at least one of the above-mentioned disadvantages.

SUMMARY OF THE INVENTION

In one of its aspects, the present invention provides a system for providing redundancy within a communication network, the system having:

a first node having a first physical private IP address in a first sub-network, a second node having a second physical private IP address in a second sub-network, with only one of the nodes being active at any given time;

a plurality of clients for accessing services and applications of the first node and the second node, the services and applications being associated with a public virtual IP address, the public virtual IP address belonging to a sub-network that is different from the first sub-network and second sub-network, and the plurality of clients being configured to use the public virtual IP address to access the services and applications;

at least one router for routing instructions related to the services and application between the clients and the first node or second node via the network, the router having routing information specifying the active node such that communication destined for the public virtual IP address is directed via either the first node or the second node; and wherein the public virtual IP address is transferred from one of the nodes to another of the nodes when the previously inactive node becomes active, such that the clients are able to seamlessly access the services and applications via the public virtual IP address associated with now active node.

In another of its aspects, the present invention provides a computer readable medium comprising instructions for routing data packets to a first node or a second node, both nodes hosting services and applications accessible by clients within a communication network in which only one of the nodes is active at any give time, the first node having a first physical private IP address in a first sub-network, the second node having a second physical private IP address in a second sub-network, with only one of the nodes being active at any given time; the services and applications being associated with a public virtual IP address, the public virtual IP address belonging to a sub-network that is different from the first sub-network and second sub-network, and the clients being configured to use the public virtual IP address to access the services and applications; the routing instructions having information specifying an active node such that communication to the public virtual IP address is routed via the physical IP address associated with the active node.

In yet another of its aspects, the present invention provides a method for routing data packets to a first node or a second node, both nodes hosting services and applications accessible by clients via a communication network in which only one of the nodes is active at any give time, the method having the steps of:

associating the first node with a first physical private IP address in a first sub-network, and associating the second node with a second physical private IP address in a second sub-network;

associating the services and applications with a public virtual IP address, the public virtual IP address belonging to a sub-network that is different from the first sub-network and second sub-network;

configuring the clients to use the public virtual IP address to access the services and applications;

providing routing instructions having information specifying an active node such that communication to the public virtual IP address is routed via the physical IP address associated with the active node.

Advantageously, the present invention allows an identical IP address to be used in a plurality of different subnets. As such, the same IP address may be used by a plurality of hosts located in two different subnets, non-simultaneously, without requiring any additional programming, using spatial clustering methods.

BRIEF DESCRIPTION OF THE DRAWINGS

Several preferred embodiments of the present invention will now be described, by way of example only, with reference to the appended drawings in which.

DETAILED DESCRIPTION OF EXEMPLARY EMBODIMENTS

The detailed description of exemplary embodiments of the invention herein makes reference to the accompanying block diagrams and schematic diagrams, which show the exemplary embodiment by way of illustration and its best mode. While these exemplary embodiments are described in sufficient detail to enable those skilled in the art to practice the invention, it should be understood that other embodiments may be realized and that logical and mechanical changes may be made without departing from the spirit and scope of the invention. Thus, the detailed description herein is presented for purposes of illustration only and not of limitation. For example, the steps recited in any of the method or process descriptions may be executed in any order and are not limited to the order presented.

Moreover, it should be appreciated that the particular implementations shown and described herein are illustrative of the invention and its best mode and are not intended to otherwise limit the scope of the present invention in any way. Indeed, for the sake of brevity, certain sub-components of the individual operating components, conventional data networking, application development and other functional aspects of the systems may not be described in detail herein. Furthermore, the connecting lines shown in the various figures contained herein are intended to represent exemplary functional relationships and/or physical couplings between the various elements. It should be noted that many alternative or additional functional relationships or physical connections may be present in a practical system.

The present invention may also be described herein in terms of screen shots and flowcharts, optional selections and various processing steps. Such functional blocks may be realized by any number of hardware and/or software components configured to perform to specified functions. For example, the present invention may employ various integrated circuit components (e.g., memory elements, processing elements, logic elements, look-up tables, and the like), which may carry out a variety of functions under the control of one or more microprocessors or other control devices. Similarly, the software elements of the present invention may be implemented with any programming or scripting language such as C, C++, Java, COBOL, assembler, PERL, extensible markup language (XML), smart card technologies with the various algorithms being implemented with any combination of data structures, objects, processes, routines or other programming elements. Further, it should be noted that the present invention may employ any number of conventional techniques for data transmission, signalling, data processing, network control, and the like.

Figure 1:
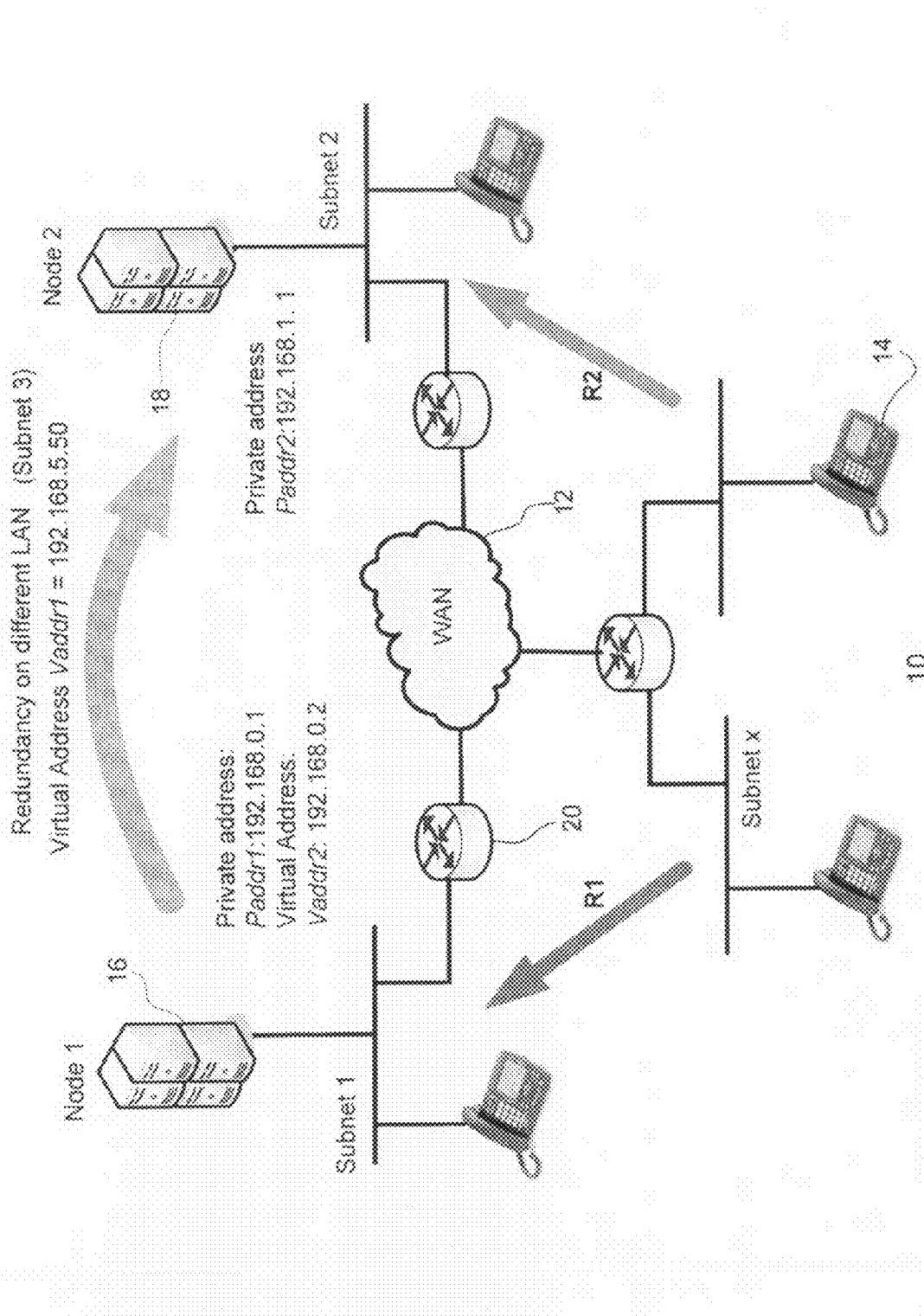
FIG. 1 depicts a exemplary redundancy mechanism for use within a communication network.

FIG. 1 shows an exemplary system 10 for providing redundancy within an exemplary communication network 12 having a plurality of communications devices 14, or clients, in communication with network nodes 16 and 18, such as servers or call servers, via routers 20, coupled thereto. The network 12 can be any type of computing network, such as the Internet, a local area network, a wide area network or combinations thereof. Accordingly, clients 14 can each communicate with the routers 20 and nodes 16, 18 via the network 12, as will be discussed in greater detail below. The client 14 is typically an IP terminal, having a keyboard (or other input devices), a display (or other output device), one or more central processing units, volatile memory (i.e. random access memory), non-volatile memory (i.e. hard disk devices) and network interfaces to allow the client 14 to communicate over network 12. The client 14 may be fixed or mobile, and includes, but is not limited to, mobile phones, IP network entities, IP terminals, H.323 terminals, DECT terminals, SIP-DECT terminals, PDAs, digital cameras, PCs, MP3 players, soft phones, game consoles, ATAs, IPTVs, TVs, remote controls, projectors, set-top boxes, satellite-navigation systems, multimedia devices, network appliances, or any combination (s) thereof. Exemplary nodes 16, 18, and routers 20 include processor means, a computer readable medium having at least an operating system, application programs or data, network interface means, I/O interface means, and input/output means.

Generally, services and/or applications, such as client/server applications, including telephony applications, are hosted by the call servers 16, 18. Each node 16 or 18 has a private physical IP address, where each private IP address is chosen such that it is in the same subnet as the server 16 or 18. As an example, the primary node 16 is a member of subnet 1, and has a private address (Paddr1:192.168.0.1), and a virtual address (Vaddr2:192.168.0.2); while the secondary node 18 is a member of subnet 2, and has a private address (IPaddr1: 192.168.1.1), as shown in FIG. 1. However, the application uses a public virtual IP address (Vaddr1:192.168.5.50), an address that is known by all of the client/server applications connected thereto, and the address is chosen to be in subnet that does not already exist, such as subnet 3. As such, node 16 and node 18 belong to a spatial cluster, and the IP phones 14 are configured to work only with the public virtual address Vaddr1.

Therefore, in the event that the application switches from one node 16 to another node 18, the public virtual address Vaddr1 is transferred to that node 18. However, as the two nodes 16 and 18 are on different subnets (1 or 2), the public virtual address Vaddr1 may not simply be reached in the two subnets (1 or 2), and so a route is therefore programmed in the routers 20 to reach this virtual address Vaddr1. Moreover, the route may change from one node 16 to the other node 18 depending on the node (16 or 18) where the application is running, and does not depend only on the physical presence of the nodes 16 or 18. Thus, the present invention includes configuring a node 16, by using a second virtual IP address (Vaddr2), configuring one of the IP routers 20, preferably using the "track directive" command.

An exemplary method for configuring the node 16 or 18, and least one of the IP routers 20, to provide routing redundancy within a communication network 14 will now be discussed in detail. The method includes a plurality of steps, such as adding a private virtual address (Vaddr2) to the application configuration, this address belongs to the same VLAN and subnet 1 of the private IP address (IPaddr1) of the node 16, subnet 1. As with the public virtual address (Vaddr1), this private virtual address (Vaddr2) is transferred to the node 16 or 18 where the application is running; and since this address (Vaddr2) is in the LAN (subnet 1) of node 16, then it is active only when the application is running on node 16.

In the next step, a static route (R2) is programmed in the computer-readable medium of one of the routers 20 to route the packets that are addressed to the public virtual address (Vaddr1) towards the physical IP address (IPaddr2) of the node 18. This route is programmed with a high weighting value (50, for example). A conditional route (R1) is programmed in one of the routers 20 to route the packets that are addressed to the public virtual address (Vaddr1) towards the physical address of the first node 16 (IPaddr1), in another step. This conditional route is programmed with a lower weighting value (1, for example), when the private virtual address (Vaddr2) is reachable.

In the instance that the application runs on the node 16, the conditional route R1 has a lower weighting value than the static one, and so the packets are routed to the private IP address (IPaddr1). Whereas, when the application switches from the node 16 to the node 18, the two virtual addresses (the public Vaddr1 and the private Vaddr2) switch from node 16 to node 18. The virtual address Vaddr2 thus becomes reachable, and route R1 becomes invalid. The only valid route is therefore the route R2 and all packets directed to the public virtual address Vaddr1 are forwarded to node 18. Now, should the application switch back from node 18 to node 16, the virtual address Vaddr2 becomes active again. As such, when the route R1 becomes valid all the packets directed to the public virtual address are sent to the node 16, since this route R1 has a lower weighting value. Switching network functions between nodes 16 or 18 is performed transparently and dynamically, thus substantially minimizing any service interruption.

As an option, symmetrical configuration could be used by replacing the static route (R2) by a conditional route driven by another private virtual address (Vaddr3) chosen in the same VLAN and subnet of the private IP address (IPaddr2) of the second node 18. This address would be active only when the application is running on the second node 18. As such, a tracking mode of the router 20 may be used to detect the right route and inform the other routers 20 of the system 10 of the virtual IP address for proper routing. Accordingly, any virtual address is accessible even if it is not hosted by a node in the same sub-network. Alternatively, a new subnet (including only the virtual address) may be configured and the virtual address is moved from one host to another by dynamically modifying the system routing table of the network 12.

Figure 2:
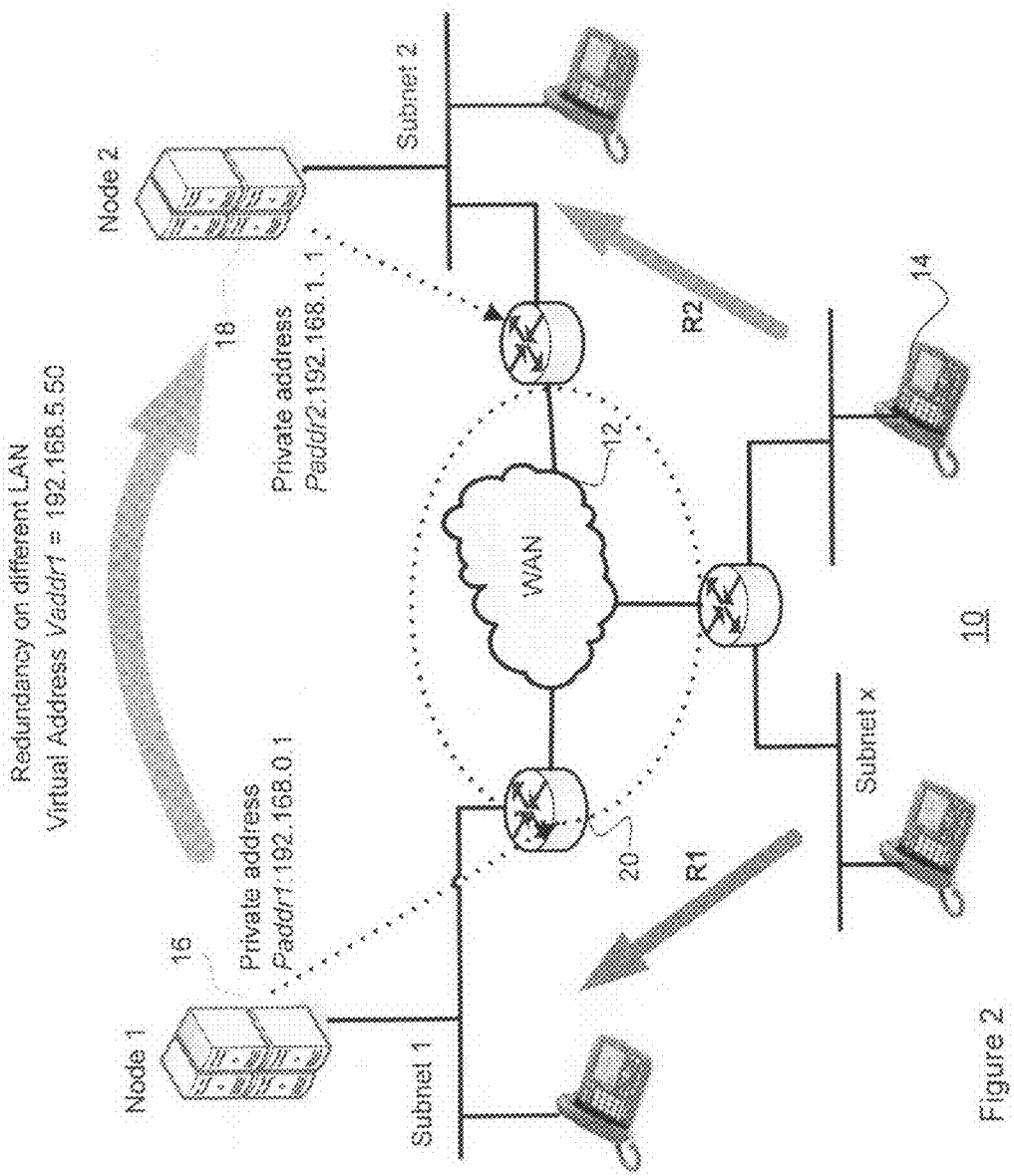
FIG. 2 depicts another exemplary redundancy mechanism for use within a communication network.

In another exemplary embodiment, as shown in FIG. 2, in addition to the functional mode described above, the physical private IP address of the active host and the route associated therewith, is transmitted to the other routers 20 of the system 10 using a network protocol such as RIP, OSPF, among others. An active host node x thus periodically sends to the network routers 20 the route to the public virtual address VAddr1 using the routing protocol, signalling that the route to the virtual address is via its physical address (IPaddrx). Meanwhile, the inactive host y sends a message to the routers 20 to signal that the route using its physical address (IPaddry) is invalid.

In more detail, when the application runs on node 16, the route R1 to the virtual network Vaddr1 is periodically published to the network routers 20, such that, all the IP packets for the Vaddr1 are transmitted to the physical private IP address (IPaddr1), as this route is preferred. When the application switches from node 16 to node 18, the virtual address (Vaddr1) is thus transferred from node 16 to the other node 18. Therefore, node 16 sends messages to the routers 20 signalling that the previous route R1 is no longer active, and the second node 18 sends a messages indicating that the route to the virtual network address (Vaddr 1) is now route R2 using the physical private IP address (IPaddr2). Accordingly, all packets directed to the virtual address (Vaddr1) are forwarded to node 18 (IPaddr2). Should the application now switch back from node 18 to node 16, the virtual address Vaddr1 becomes active on node 16, and inactive on node 18. The node 18 broadcasts a message signalling that the route R2 is now invalid and node 16 send a message signalling that the route R1 to the (Vaddr1) is now Ipaddr1, and all the data packets directed to the public virtual address are now sent to node 16. As such, no additional network devices, such as gateways or switches are required to forward the data packets via the valid route, and router modifications are not required. The node 16 and node 18 belong to a spatial cluster, and the clients 14 are configured to work only with the public virtual address Vaddr1. Advantageously, the clients 14 are thus node-agnostic, as they do not require any details related to the physical private IP addresses (IPaddr1 or IPaddr2), associated with the nodes 16, 18, respectively, as the routes to the services and applications are subject to change.

Benefits, other advantages, and solutions to problems have been described above with regard to specific embodiments. However, the benefits, advantages, solutions to problems, and any element(s) that may cause any benefit, advantage, or solution to occur or become more pronounced are not to be construed as critical, required, or essential features or elements of any or all the claims. As used herein, the terms "comprises," "comprising," or any other variations thereof, are intended to cover a non-exclusive inclusion, such that a process, method, article, or apparatus that comprises a list of elements does not include only those elements but may include other elements not expressly listed or inherent to such process, method, article, or apparatus. Further, no element described herein is required for the practice of the invention unless expressly described as "essential" or "critical."

The preceding detailed description is presented for purposes of illustration only and not of limitation, and the scope of the invention is defined by the preceding description, and with respect to the attached claims.

The embodiments of the invention in which an exclusive property or privilege is claimed are defined as follows:

1. A system for providing redundancy within a communication network, the system having:
    a first node having a first physical private IP address in a first sub-network, a second node having a second physical private IP address in a second sub-network, with only one of said nodes being active at any given time;
    a plurality of clients for accessing services and applications of said first node and said second node, said services and applications being associated with a public virtual IP address, said public virtual IP address belonging to a sub-network that is different from said first sub-network and second sub-network, and said plurality of clients being configured to use said public virtual IP address to access said services and applications;
    at least one router for routing instructions related to said services and application between said clients and said first node or second node via said network, said router having routing information specifying the active node such that communication destined for said public virtual IP address is directed via either said first node or said second node; and
    wherein said public virtual IP address is transferred from one of said nodes to another of said nodes when the previously inactive node becomes active, such that said clients are able to seamlessly access said services and applications via said public virtual IP address associated with now active node.

2. The system of claim 1 wherein said virtual IP address is public and belongs to the same sub-network with said first node associated with said first physical private IP address and said first node being active, and wherein said public IP address being transferable to said first node when it becomes inactive to said second node.

3. The system of claim 2 wherein said at least one router includes instructions to route data addressed to said public virtual address towards said second physical private IP address associated with said second node via a static route.

4. The system of claim 3 wherein said at least one router includes instructions to route data addressed to said public virtual address towards said first physical private IP address associated with said first node via a conditional route, wherein said private virtual address is reachable.

5. The system of claim 4 wherein a route via said conditional route and said static route are each assigned a weighting value, wherein a lower weighting value represents a less desirable route and a higher weighting value represents a more desirable route.

6. The system of claim 5 wherein said conditional route is assigned a lower weighting value than said static route.

7. The system of claim 6 wherein static route is replaced by another conditional route via another private virtual address chosen in the same virtual LAN and same sub-net of said second physical private IP address associated with said second node.

8. The system of claim 6 wherein when said services and applications switch from said first node to said second node, said public virtual address and said private virtual address are switched from said first node to said second node, such that said static route is no longer valid and said conditional route is valid, and all packets directed towards said public virtual address are directed to said second node.

9. The system of claim 1 wherein said services and applications run on said first node, a first route to said public virtual network via said first private IP address is periodically published to said at least one router via a routing protocol, such that all packets destined for said public virtual network are transmitted to said first private IP address and routed by said at least one router to said first private IP address associated with said first node.

10. The system of claim 9 wherein when said services and applications switch from said first node to said second node, a second route to said public virtual network via said second private IP address is periodically published to said at least one router via a routing protocol, such that all packets destined for said public virtual network are transmitted to said second private IP address and routed by said at least one router to said second private IP address associated with said second node, wherein said first route is no longer valid.

11. The system of claim 10 wherein when said services and applications switch from said second node to said first node, said second route is no longer valid and first second route to said public virtual network via said first private IP address is now periodically published to said at least one router via a routing protocol, such that all packets destined for said public virtual network are transmitted to said first private IP address and routed by said at least one router to said first private IP address associated with said first node.

12. The system of claim 11 wherein an identical public virtual IP address may be used by a plurality of nodes located in at least one different subnet, non-simultaneously, without requiring any additional programming in said at least one router, and wherein clients do not require any details related to the physical private IP addresses associated with the nodes, as the routes to said services and applications are subject to change.

13. A non-transitory computer readable medium comprising instructions for routing data packets to a first node or a second node, both nodes hosting services and applications accessible by clients within a communication network in which only one of said nodes is active at any given time, said first node having a first physical private IP address in a first sub-network, said second node having a second physical private IP address in a second sub-network, with only one of said nodes being active at any given time; said services and applications being associated with a public virtual IP address, said public virtual IP address belonging to a sub-network that is different from said first sub-network and second sub-network, and said clients being configured to use said public virtual IP address to access said services and applications; said routing instructions having information specifying an active node such that communication to said public virtual IP address is routed via the physical IP address associated with said active node.

14. The non-transitory computer readable medium of claim 13 having a first set instructions for routing said data packets destined for said public virtual network via said first private IP address associated with said first node when said services and applications run on said first node, said first set of instructions being periodically published to said at least one router in said network via a routing protocol.

15. The non-transitory computer readable medium of claim 14 having a second set of instructions for routing said data packets destined for said public virtual network via said second private IP address associated with said second node when said services and applications switch from said first node to said second node, said second set of instructions being periodically published to said at least one router in said network via said routing protocol.

16. A method for routing data packets to a first node or a second node, both nodes hosting services and applications accessible by clients via a communication network in which only one of said nodes is active at any given time, the method having the steps of:
associating said first node with a first physical private IP address in a first sub-network, and associating said second node with a second physical private IP address in a second sub-network, with only one of said nodes being active at any given time;
associating said services and applications with a public virtual IP address, said public virtual IP address belonging to a sub-network that is different from said first sub-network and second sub-network;
configuring said clients to use said public virtual IP address to access said services and applications;
providing routing instructions having information specifying an active node such that communication to said public virtual IP address is routed via the physical IP address associated with said active node.

17. The method of claim 16 having the further steps of:
providing a first set instructions for routing said data packets destined for said public virtual network via said first private IP address associated with said first node when said services and applications run on said first node; and
periodically publishing said first set of instructions to at least one router in said network via a routing protocol.

18. The method of claim 16 having the further steps of:
providing a second set instructions for routing said data packets destined for said public virtual network via said second private IP address associated with said second node when said services and applications switch from said first node to said second node; and periodically publishing said second set of instructions to said at least one router in said network via said routing protocol.

19. The method of claim 18 wherein said instructions eliminate the requirement of modifying the router configuration file to reflect a change in the node hosting said services and applications.

20. The method of claim 16 having the further steps of tracking the health status of at least one router to detect the right route to said public virtual IP address, and informing any other routers of said network via dynamic modification of a routing table.

* * * * *